Patented Nov. 19, 1946

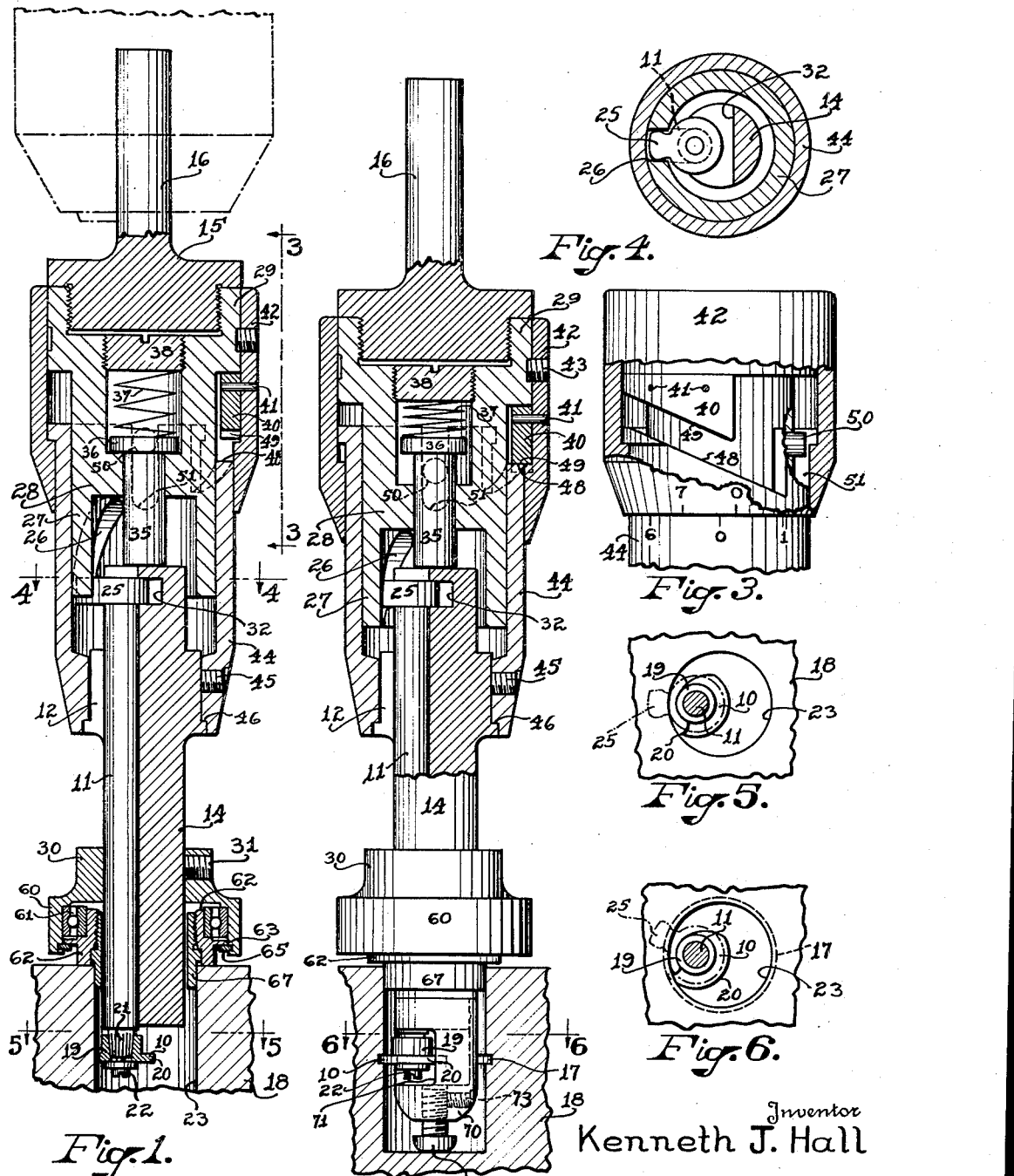

2,411,426

UNITED STATES PATENT OFFICE 2,411,426

INTERNAL FORMING DEVICE

Kenneth J. Hall, Worcester, Mass., assignor, by mesne assignments, to The Elliot Company, Worcester, Mass., a corporation of Massachusetts Application March 29, 1944, Serial No. 528,522

7 Claims. (Cl. 77—58)

This invention relates to an internal forming tool and more particularly to a tool capable of cutting a recess or groove on an internal surface or knurling or rolling beads or forming surfaces of required radii or other types of recesses and shapes.

Problems have been presented heretofore in forming annular grooves within the cylindrical bore of massive work pieces, such as castings and forgings, which are not readily mounted and capable of rotation on standard types of machine tools heretofore employed for forming internal grooves. For example, in order to mount ball or roller bearings in a cylindrical opening within a large forging, it may be required to provide one or two internal grooves shaped and arranged for holding retaining rings for the raceways. It has often required a master craftsman to form such precise shapes on an internal surface; and in many cases it has been difficult or even impossible to produce a desired shape inside a hole or tube or shell and particularly where the hole is narrow or the workpiece is difficult to handle.

The primary object of my invention is to satisfy such conditions and provide a rotatable forming tool which is so mounted and arranged that the tool may be inserted within an opening and then moved laterally and caused to cut an internal groove or produce a desired form within the work piece.

A further object of the invention is to provide a tool of this type which may be readily mounted in a standard drill press, boring mill, lathe, reamer or other suitable machine and whereby the tool may be controlled manually or automatically to form the desired shape within the work piece.

Another object is to provide an internal forming tool with precision mechanism which is so constructed that an annular recess may be cut within a work piece to a predetermined depth.

Further objects are to provide such a tool which is so constructed that it may operate on the work piece at a predetermined distance from a surface thereof and which may be readily adjusted manually as required for the different sizes of openings in the work pieces.

A still further object is to provide a device of this type wherein the forming tool and associated parts may be readily removed and replaced as required to form various shapes and sizes of work pieces. Other objects will be readily apparent in the following disclosure.

Referring to the drawing which illustrates a preferred embodiment of this invention:

Fig. 1 is a vertical section through a forming tool and a fragment of the work piece which shows the parts as located at the beginning of a cutting operation;

Fig. 2 is a similar view showing the location of the parts at the end of the forming operation, this view also showing a tool locating device applied at the lower end of the rotatable spindle;

Fig. 3 is a fragmentary elevation on the line 3—3 of Fig. 1 which is partly broken away to show the associated stops arranged to limit the depth of cut;

Fig. 4 is a section taken on the line 4—4 of Fig. 1 showing the cam slot and follower which cause the outward cutting motion of the forming tool;

Fig. 5 is a section taken substantially on the line 5—5 of Fig. 1 which shows the cutting tool in a retracted position; and Fig. 6 is a similar view showing the cutting tool at substantially the end of the cutting operation.

The specific embodiment of my invention illustrated in the drawing is a cutting tool adapted to be mounted in a standard drill press and controlled manually or automatically in its cutting operation by the drill press mechanism which normally serves to move the drill downwardly. It may be similarly mounted on other machines, such as a turret or other form of lathe, and its operation may be either partially or fully automatic. The construction illustrated is so made that the cutting tool may be inserted into the bore of a work piece while in a retracted position; and it is properly located by an adjustable gauge head, after which further downward motion of the drill press spindle serves to operate cam mechanism which throws the cutting tool into operative contact with the internal surface of the work piece, and the pressure of the manually or automatically controlled feed mechanism of the drill press causes the tool to cut a groove in the work piece to a depth which is predetermined by an adjustably positioned stop. Similar constructions may be employed for forming knurls, beads, etc.

The forming tool 10, which may be of any suitable construction for the desired purposes, such as cutting a groove, rolling a bead or knurling a surface, is removably mounted on the end of a vertical tool shaft 11. That shaft is removably mounted within an open vertical recess 12 formed in the spindle 14. This spindle is carried and rotated by the driving head 15 which has a shank 16 adapted to be suitably mounted in and rotated by the chuck of the drill press. The cutting tool 10 is eccentric relative to the axis of the spindle 14 so that it may be revolved to cut an internal groove 17 (Fig. 2) in the work piece 18.

The forming tool 10 may be of various shapes and constructions, but as shown particularly in Figs. 5 and 6, it may comprise a sleeve 19 carrying a part cylindrical portion 20 provided with a forward cutting edge. The sleeve 19 is of small diameter and is provided with a conically shaped internal recess that may be provided with knurling shaped to fit with the knurled tapered end 21 of the cutter shaft 11 and thus cause the tool to revolve with the spindle. A set screw 22 serves to hold the cutter tool removably in place. It will thus be seen that when the tool is in the position shown in Figs. 1 and 5, the assembly may be readily inserted into the cylindrical opening 23 in the work piece.

Cam mechanism is provided which serves to turn the cutter shaft 11 about its axis and thus rotate the cutter tool into a cutting position, as shown in Fig. 6. To this end, the upper end of the shaft 11 is provided with a cam follower 25 which rides in a cam slot 26 cut from the lower edge upwardly at a suitable angle, such as 30°, in the barrel shaped wall 27 of the cam body 28. Movement of the cam body downwardly relative to the cam follower 25 will cause the cutter shaft 11 to rotate about its axis and thus swing the cutting tool 20 into operative engagement with the work.

The cam body 28 has a stepped bore axially thereof, as shown in Figs. 1 and 2, and the upper enlarged flange 29 thereof is provided with a right-hand thread which is threaded onto the driving head 15 that is mounted in the drill chuck. Thus rotation of the drill chuck tends to rotate the cam body 28. This rotative force is transmitted through the cam follower 25, as well as a pin 50, to be described, and so serves to turn the spindle 14 and revolve the cutting tool carried thereby.

Vertical movement of the cam body 28 relative to the spindle 14 and the cutter tool shaft 11 is effected by the manual or automatic operation of the drill press which causes the entire tool to move downwardly. A gauge head 30 is slidably or otherwise adjustably mounted on the spindle 14 adjacent to its lower end, and this head serves as a stop which prevents further downward movement of the entire tool and thus causes the cam body 28 to move downwardly relative to the axially immovable spindle 14. The cam follower 25 is a lug projecting outwardly from a sleeve shaped body which is secured on the shaft 11. This follower rides within a lateral slot 32 in the top of the spindle 14 which prevents endwise movement of the cutter shaft relative to the spindle. A pin 35 rests against the top of the spindle 14 and is slidably mounted in a central hole within the cam body 28. A head 36 on the pin engages a shoulder on the cam body and thus holds the pin assembled. A spring 37 is located within the enlarged bore of the hole carrying the head 36. One end of the spring presses against the head 36 and the other is held in place by a cap screw 38 threaded into the cam body 28. This spring urges the cam body 28 upwardly and the cam follower 25 downwardly, and it thus tends to swing the cutting tool to a retracted, inoperative position.

It will now be appreciated that when the tool is moved downwardly by the drill chuck, the cutter 10 will be held in a retracted position until the gauge head 30 strikes the top of the work. Then, further downward movement of the drill chuck, as caused by a manual or automatic control of the drill press, will force the cam body 28 downwardly against the pressure of the spring 37 and cause the cam slot 26 to revolve the cam follower 25 and thrust the tool into engagement with the work. If the machine is manually controlled, the operator thereafter governs the rate of cutting the work piece by the muscular effort which he applies to the controlling mechanism of the drill press. The cam 26 is shown extending in such a direction that movement of the head towards the stop 30 causes the forming tool to rotate in a right hand direction about the spindle axis and in the direction of revolution of the tool, so that the work opposes the rotation of the tool to a cutting position and thus tends to force the tool into an inoperative position, and so insures release of that tool and its quick removal at the end of a cutting operation.

The depth of cut is controlled by a special stop mechanism which limits the downward movement of the cam body relative to the spindle 14. This comprises an arcuate triangular shaped stop 40 which is secured by small pins 41 to an outer thimble 42. This thimble is adjustably secured to the cam body 28 by a set screw 43 riding in an annular groove in the cam body and thus remains fixed relative thereto, except when the stop 40 is to be adjustably moved to a new position. A shell 44 is secured by a set screw 45 to the spindle 14. This shell forms a sleeve located between the cam body 28 and the thimble 42. Cooperating shoulders 46 on the spindle 14 and the bottom of the shell locate the parts. The upper edge of the shell 44 is cut away to provide an arcuate triangular opening having a top surface 48 which is parallel to the lower sloping surface 49 of the stop 40. These sloping surfaces may extend through an arc of about 90°. These two surfaces slope at the same angle, so that when the set screw 43 is loosened the thimble 42 may be rotated to bring the stop surface 49 closer to or farther away from the surface 48.

A vernier scale (Fig. 3) on the adjacent surfaces of the thimble 42 and the shell 44 serves to give an accurate adjustment of the position of the stop 40 relative to the abutment surface 48. The scale is preferably so arranged that when the zero marks are in alignment, the stop 40 is so close to the surface 48 that the cutter tool may be swung laterally only into contact with the work by the downward movement of the drill press spindle. The maximum spacing of the stop surface 49 and the sloping surface 48 permits the maximum depth of cut. That is, the downward movement of the drill chuck may proceed after the gauge head has contacted with the top of the work and thus progressively swing the cutter tool 20 farther outwardly and so cut the work slot deeper until the stop surfaces 48 and 49 have come into engagement and further downward movement of the drill press head is impossible. Two pins 50 project diametrically oppositely from the cam body 28 and ride in two vertical slots 51 cut downwardly from the upper edge of the shell 44. Thus the shell, which is secured to the spindle 14, and the cam body 28 are forced to rotate together for all positions of the cam body. These pins transmit the rotative force of the drill press to the cutter tool.

The gauge head 30 may be constructed in various ways, but it preferably comprises a downwardly projecting flange 60 carrying ball bearing raceways 61 therein. The inner raceway of the bearings is held by a bushing 62 having an outwardly projecting flange 63 providing a shoulder which holds the bearings upwardly in position. A substantially U-shaped retaining ring 65 may be snapped into position within the grooves in the flange 60 below the flange 63, and this serves to hold the bushing up in place when the tool is not in use. During operation of the tool, the downward thrust against the gauge head is transmitted to the top of the surface of the work 18 by the ball bearings, and thus the bushing serves as a limit stop. Threaded within this bushing 62 is a bushing sleeve 67. This part is intended to fit within the cylindrical surface 23 of the work piece and thus locate the cutting tool accurately. This sleeve may be exchanged for other parts of a different size to accommodate different sized holes; and if desired a shoulder on the sleeve may serve as the stop which limits the downward movement of the tool spindle. There is sufficient clearance between the inner surface of the sleeve 67 and the spindle 14, so that the latter may rotate without rotating the bushing 62 and its associated sleeve as is permitted by the ball bearing assembly. Thus the spindle 14 will rotate freely and revolve the cutting tool in operative contact with the work, while the stop comprising the bushing 62 and sleeve 67 remains stationary.

Various expedients may be adopted for positioning the cutting tool within the work. In the form shown in Fig. 1, the gauge head may be manually moved after the set screw 31 has been loosened, and the position of the cutting tool may be predetermined by various types of measuring instruments. In the construction shown in Fig. 2, I have provided the bottom of the spindle 14 with a sleeve 70 removably fitted thereon which has a slot 71 cut in its side so that the cutter tool 10 may project laterally through the sleeve. In the bottom of this sleeve 70 is a stop screw 72, the head of which is adapted to be adjusted into a correct position so that when it engages the bottom of the hole in the work piece the cutting tool is correctly positioned for cutting the slot 17. A set screw 73 serves to hold this stop screw 72 in its adjusted position, so that rotation of the cutter will not affect its adjustment. The spindle 14 may also be exchanged for spindles of different lengths and diameters, and the gauge head 30 is likewise replaceable by parts of suitable dimensions to accommodate the many requirements.

The operation of the device will be readily apparent in view of the above disclosure. The work piece is suitably mounted on the table of a drill press, for example, and the internal forming tool is suitably secured in the drill chuck. The forming tool is rotated by the drill spindle; and by manipulation of the press control mechanism, the tool is brought downwardly until the sleeve 67 of the gauge head enters the work and the bushing 62 engages the top surface thereof and thus prevents further downward movement of the tool. At this position the cutter 20 is properly positioned for cutting the groove 17 in the work. Further downward movement of the rotating tool causes the cam body 28 and its associated thimble 42 to move downwardly. This forces the cam follower 25 from its inoperative position, which is substantially that shown in Fig. 5, and thrusts the cutting tool into engagement with the work. From that time on, the operator forces the cutter steadily into the work as it revolves in its eccentric relationship with the spindle 14, and the tool cuts progressively into the work until the stop 49 comes into contact with the abutment surface 48. As soon as the operator moves the drill press mechanism to withdraw the tool, the release of pressure causes the compressed spring 37 to hold the spindle and associated cutter down in the operative position while the cam 29 is moved upwardly relative to the cam follower 25. This causes the cutter tool to be removed progressively from the recess which it has cut in the work piece, and this retraction of the cutter is completed while the spindle 14 is axially stationary. Thereafter, the continued upward movement of the drill press head removes the retracted cutter and the spindle from the work. To cut a different depth of recess in the work, the set screw 43 is released from engagement with the cam body 28 and the thimble 42 is turned to any desired position as indicated by the vernier scale. This moves the stop 49 toward or from the arcuate sloping surface 48. When the stop 72 shown in Fig. 2 is used, the gauge head 30 may be omitted, if desired, since the stop 72 will resist downward movement of the tool and cause the cam mechanism to thrust the forming tool 10 into cutting contact with the work. Either the gauge head 30 or the stop 72 serves two functions, in that it definitely positions the forming tool relative to the work and it limits the movement of the tool, as caused, for example, by manual reciprocation of the drill press head, so that further downward movement of the head forces the tool into engagement with the work and causes it to penetrate the work to a depth which is limited only by the capabilities of the cam mechanism or by the setting of the stop 49.

It will now be appreciated that various mechanical equivalents may be substituted for the parts shown, such as the cams and stops, and that many modifications may be made in this construction within the scope of this invention. Hence the above disclosure is to be interpreted as illustrating the principles of this invention and preferred embodiments thereof and not as imposing limitations on the claims appended hereto.

I claim:

1. An internal forming device comprising a tool supporting head arranged for a relative rotary movement with respect to an internal surface of a work piece, a spindle slidably keyed to the head, a tool shaft rotatably mounted on the spindle with its axis parallel to and at a fixed distance from the spindle axis, a forming tool projecting laterally from the end of the shaft which is moved into and out of contact with the work surface by rotating the shaft relative to the spindle, a cam and a follower, one being slidably carried by the head and the other connected to the shaft so that relative movement of the head axially of the spindle causes the tool to be forced against the internal work surface, and a limit stop for the spindle which causes axial pressure on the head to turn the tool shaft.

2. An internal forming device comprising a tool supporting head, a spindle slidably keyed to the head in axial alignment therewith, a tool shaft rotatably mounted on the spindle with its axis parallel to and at a fixed distance from the spindle axis, a forming tool projecting laterally from the end of the tool shaft and arranged to be moved into and out of contact with the work surface by rotating the shaft relative to the spindle, a cam carried by the head, a cam follower carried by the tool shaft, and a stop which limits the axial movement of the spindle into the work, so that axial movement of the head relative to the stop causes the tool shaft to be rotated and the tool to be thrust outwardly and gradually into contact with the work as pressure is exerted on the head.

3. An internal forming device comprising a tool supporting head arranged for a relative rotary movement with respect to an internal work surface, a spindle aligned axially with the axis of rotation, a keyed connection between the head and the spindle permitting axial movement of the head, a stop for limiting the movement of the spindle into a work piece, a tool shaft rotatably mounted on the spindle with its axis parallel to and at a fixed distance from the spindle axis, a forming tool projecting laterally from the end of the shaft, a cam and a cam follower, one member being adjustably connected to the head and the other connected to the shaft so that axial movement of the head as determined by the relative adjustment of the cam parts rotates the tool shaft and feeds the tool into the work to a predetermined depth of cut.

4. An internal forming device comprising a rotary head, a spindle slidably keyed to the head and axially aligned therewith, a tool shaft rotatably mounted on the spindle with its axis parallel to the spindle axis and at a fixed distance therefrom, a forming tool projecting laterally from the lower end of the shaft and arranged to be turned into contact with the work surface by rotation of the shaft relative to the spindle, a cam body carried by the head, a cam follower carried by the tool shaft, a stop carried by the spindle which positions the forming tool in the work and causes axial movement of the head to operate the cam parts and rotate the cutter shaft, and a spring tending to move the cutter shaft to an inoperative position, said cam being so arranged that movement of the head towards the stop turns the cutter tool in its direction of revolution about the spindle axis so that the work tends to turn the forming tool to an inoperative position and thereby permits the spring to retract the tool readily from the formed work.

5. An internal forming device comprising a tool supporting head arranged for a relative rotary movement with respect to an internal work surface, a spindle slidably keyed to the head, a tool shaft rotatably mounted on the spindle with its axis parallel to and at a fixed distance from the spindle axis, a laterally projecting forming tool mounted on the end of the shaft for rotative adjustment relative thereto, a locating stop carried by the spindle and arranged to enter the work opening and locate the forming tool as well as to limit the movement of the spindle, and a cam and a follower, one being connected to the head and the other being connected to the rotary shaft, so that pressure against the head when the stop engages the work causes the cam to rotate the shaft and turn the forming tool outwardly to cut the work to a depth determined by the cam movement.

6. An internal forming device comprising a tool supporting head arranged for a relative rotary movement with respect to an internal surface of the work piece, a spindle axially aligned with the axis of rotation and slidably keyed to the head, a forming tool shaft rotatably mounted on the spindle with its axis at a fixed distance from the spindle axis, a forming tool adjustably mounted on the lower end of the tool shaft with its cutting edge projecting laterally therefrom, a stop carried by the spindle which determines the location of the forming tool in the work and holds the spindle axially immovable during a forming operation, a cam on the head and a cam follower on the shaft which are arranged to turn the tool outwardly to cut the work when the head is moved axially towards the stop, and a precision device for adjusting the extent of movement of the head relative to the spindle and thereby predetermining the depth of cut of the forming tool into the work.

7. An internal forming device comprising a head arranged to be mounted on a machine tool for a relative rotation and reciprocation with respect to a work piece, a spindle axially concentric with the head and slidably keyed thereto, a forming tool shaft carried by the spindle with its axis parallel to and spaced from the spindle axis by a fixed distance, a laterally projecting forming tool adjustably secured to the lower end of the shaft, a stop carried by the spindle arranged to engage the work and locate the forming tool therein, bearings between the spindle and the stop which permit the latter to remain stationary during the relative rotation of the spindle and the work, a cam and a follower, one being carried by the head and the other connected to the shaft so that when the stop engages the work axial pressure on the head causes the cam to turn the shaft and thrust the forming tool outwardly into cutting contact with the work, and precision means for adjusting the extent of movement of the head toward the stop and thereby predetermining the depth of cut.

KENNETH J. HALL.